United States Patent
Yet et al.

(10) Patent No.: US 6,466,208 B1
(45) Date of Patent: Oct. 15, 2002

(54) APPARATUS AND METHOD FOR ADJUSTING 3D STEREO VIDEO TRANSFORMATION

(75) Inventors: Kwo-Woei Yet, Hsinchu (TW); Ruen-Rone Lee, Hsinchu (TW)

(73) Assignee: Silicon Integrated Systems Corporation, Hsin-Chu (CN)

( * ) Notice: Subject to any disclaimer, the term of this patent is extended or adjusted under 35 U.S.C. 154(b) by 0 days.

(21) Appl. No.: 09/467,199

(22) Filed: Dec. 20, 1999

(51) Int. Cl.[7] ............................................. G06T 15/20
(52) U.S. Cl. ..................................... 345/427; 345/419
(58) Field of Search .................................. 345/419, 427

(56) References Cited

U.S. PATENT DOCUMENTS

| | | | | |
|---|---|---|---|---|
| 5,953,014 A | * | 9/1999 | Wood | 345/422 |
| 6,005,607 A | * | 12/1999 | Uomori et al. | 345/32 |
| 6,084,594 A | * | 7/2000 | Goto | 345/427 |
| 6,130,672 A | * | 10/2000 | Yamazaki et al. | 345/166 |
| 6,160,909 A | * | 12/2000 | Melen | 345/419 |
| 6,198,484 B1 | * | 3/2001 | Kameyama | 345/419 |
| 6,262,743 B1 | * | 7/2001 | Allio | 345/427 |

* cited by examiner

Primary Examiner—Mark Zimmerman
Assistant Examiner—Enrique Santiago
(74) Attorney, Agent, or Firm—Ladas & Parry

(57) ABSTRACT

The present invention discloses an apparatus and method for adjusting 3D transformation applied in a 3D computer graphic processing system, using a simple and practical computing method to simulate visual effect of human's eyes to separate input video into a left video and a right video. By the focus effect of the left video and the right video, a user can feel effect of changing depth of the input video, and creating 3D effect. Additionally, the present invention provides many parameters for convenience in adjusting the video depth and location in a display plane by users.

6 Claims, 5 Drawing Sheets

APPARATUS AND METHOD FOR ADJUSTING 3D STEREO VIDEO TRANSFORMATION

BACKGROUND OF THE INVENTION

1. Field of the Invention

The present invention relates to an apparatus and method for converting a projected 3D video (or a 2D video after projection) into a stereo 3D video, particularly to an apparatus and method of separating an input projected 3D video into a left video and a right video by using human parallax theorem, and causing a user feel a 3D stereo video.

2. Description of the Related Art

Because well-known display apparatuses are two dimensional and the video taken by users are three dimensional, it is necessary to project the 3D video taken by users into a 2D space video, called projected 3D video, for displaying. Since the projected 3D video only has the direction of the X axis and the Y axis and lacks the direction of the Z axis representing the depth of the video, the human's eyes can not feel the 3D stereo effect.

Usually a 3D video is formed due to different distances felt by the human left eye and right eye. For creating a 3D effect in a 2D display apparatus, the most simplest method of creating a 3D video is to use two cameras simulating the eyes of human beings. However, the creating method is costly, and thus it is not practical. Another method for creating a 3D video is to use single camera, and a computer programmer must adjust an application program to generate a left video and a right video by himself This method will impose a lot of workload on the computer programmer and is not compatible with the existing system.

In view of the above descriptions, the conventional methods and the apparatuses for converting a projected 3D video into a 3D stereo video do not meet the need in the market.

SUMMARY OF THIS INVENTION

The object of the present invention is to eliminate the drawbacks of high cost and inconsistency with the existing system. To this end, the present invention provides a new 3D stereo transformation apparatus and method for solving the above drawbacks. The method uses the principle of parallax of human's eyes to generate 3D effect for users. Firstly, input a projected 3D video. Secondly, divide the projected 3D video into a left video and a right video through computation. Thirdly, output the left video and the right video to a display apparatus through a rendering mechanism. The left video and the right video are generated by, for example, a software driver, and are independent from the form of input video. Because of the features, the present invention can be consistent with the existing system and will not raise workload of a computer programmer.

The present invention can also be implemented by hardware to speed up the displaying speed. For example, the present invention comprises a data storage mechanism, a left-video generating mechanism, a right-video generating mechanism and a rendering mechanism. The data storage mechanism is used to storage an input projected 3D video. The left-video generating mechanism is connected to the data storage mechanism for generating a left video. The right-video generating mechanism is connected to the data storage mechanism for generating a right video. The rendering mechanism is connected to the left-video generating mechanism and the right-video generating mechanism for outputting the left video and the right video to a display apparatus outside the present invention.

BRIEF DESCRIPTION OF THE DRAWINGS

This invention will be described according to the accompanying drawings in which:

FIG. 3($b$) shows a diagram of the distance between the human's eyes and an object vs. Z buffer;

FIG. 7($b$) shows a schematic diagram of different positions of projected videos of an object observed by human's eyes when the position of a display plane is changed.

PREFERRED EMBODIMENT OF THE INVENTION

Figure 1:
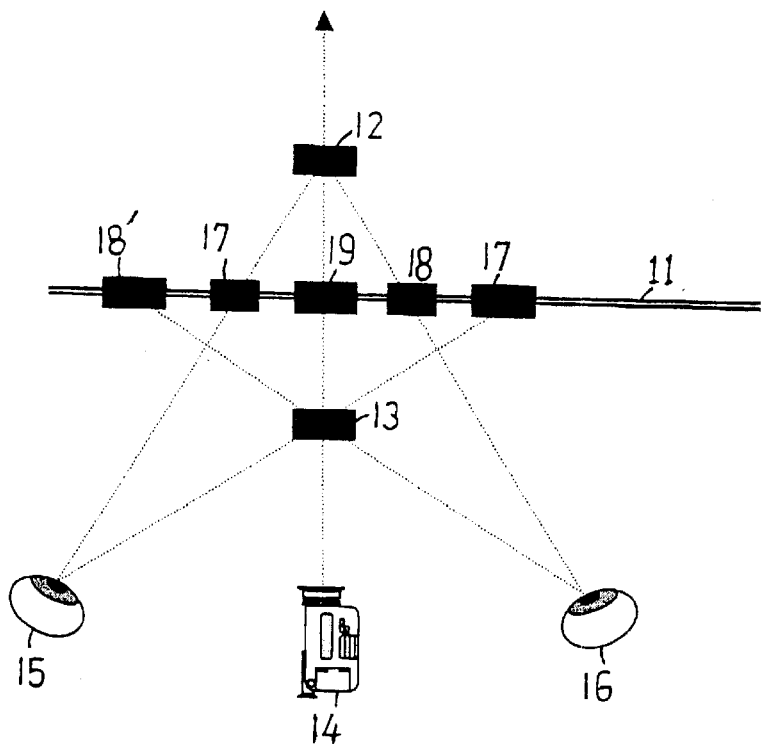
FIG. 1 illustrates the reason why a 3D video is generated by the parallax of human's eyes.

FIG. 1 illustrates the reason why a 3D video is generated by the parallax of human's eyes. A display plane 11 is a plane on which a projected video of an object is observed by people. As far as a camera 14 is concerned, photoed objects 12 and 13 are both projected to the same position 19 on the display plane 11, that people will not feel any depth difference of the objects 12 and 13, thus lacking the 3D effect. Viewed from the human's left eye 15, because the object 12 is behind the display plane 11, the projected video of the object 12 will be at the position 17, which is at left part of the display plane 11 (i. e. at the same side with left eye on the left side of the camera 14). Because the depth of the object 13 is in front of the display plane 11, the projected video of the object 13 will be at the position 17', which is at right part of the display plane 11 (i. e. at the opposite side of the left eye). Viewed from the human's right eye 16, because the depth of the object 12 is behind the display plane 11, the projected video of the object 12 will be at the position 18, which is at right part of the display plane 11 (i. e. at the same side with the right eye on the right side of the camera 14). Because the depth of the object 13 is in front of the display plane 11, the projected video of the object 13 will be at the position 18', which is left part of the display plane 11 (at the opposite side of the right eye). It will be known from the above description that if we want to show 3D effect of the objects 12 and 13, we must simulate the human's left eye and right eye to show the displacement of the projected objects on the display plane 11. From above example, it is necessary to show the displacements between the projection positions 17 and 17', and projection positions 18 and 18' of the objects 12 and 13 on display plane 11 and the projection position 19 of the camera 14 on display plane 11, respectively.

Figure 2:
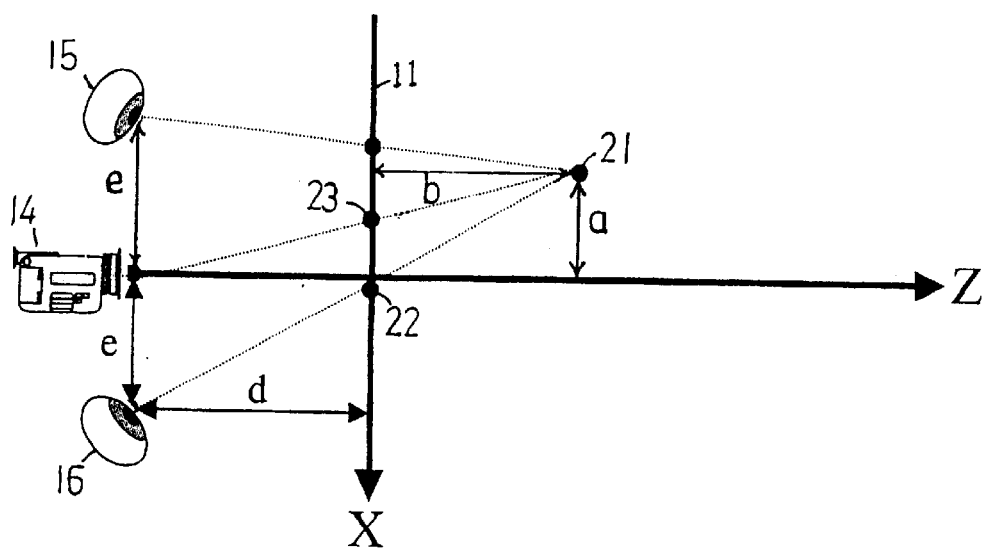
FIG. 2 shows a schematic diagram of a relative distance of an object observed by a right eye.

FIG. 2 shows a schematic diagram of a relative distance of an object observed by a right eye. FIG. 2 only shows X axis and Z axis (depth axis), because the human's left eye 15 and right eye 16 move only transversely so that any movement in the vertical direction (Y axis) can be neglected. In FIG. 2, the distance between the right eye 16 and X axis is d, the distance between the right eye 16 and Z axis is e, the distance between an object 21 and X axis is b, the distance between the object 21 and Z axis is a, the line formed from the right eye 16 to the object 21 and X axis are intersected at point 22, and the line formed from the camera 14 to the object 21 and X axis are intersected at point 23. According to the distance between point 22 and point 23, the displacement on X axis between the right eye 16 and the camera 14 can be obtained. By using triangular functions, the displacement between the point 22 and Z axis is (a×d)/(b+d) and the displacement between the point 23 and Z axis is (b×e+a×d)/(b+d). Therefore the displacement between the point 22 and the point 23 is (b×e)/(b+d). In the same reason, the displacement of a 3D video felt by left eye is −(b×e)/(b+d).

Figure 3:
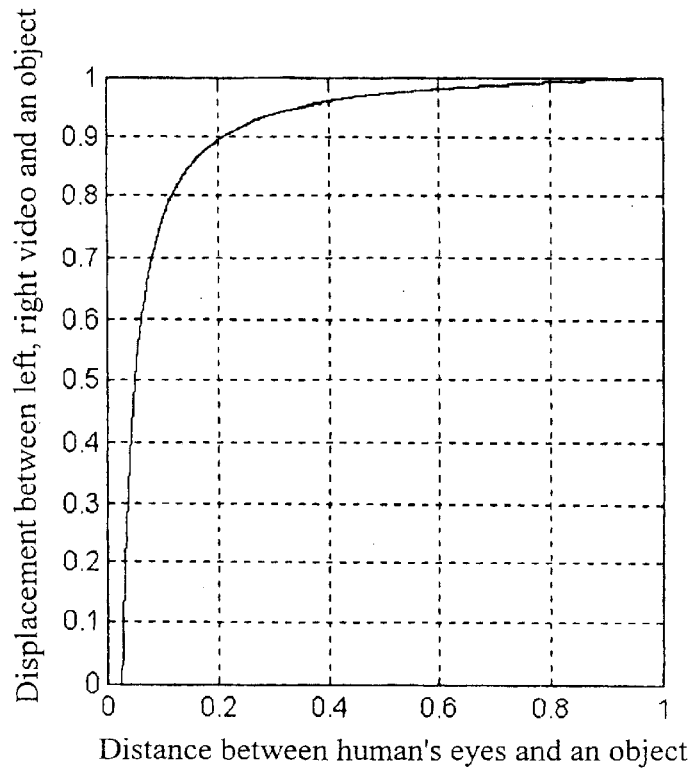
FIG. 3($a$) shows a diagram of the distance between the human's eyes and an object vs. the distance between a left or right video and an object.
Figure 3:
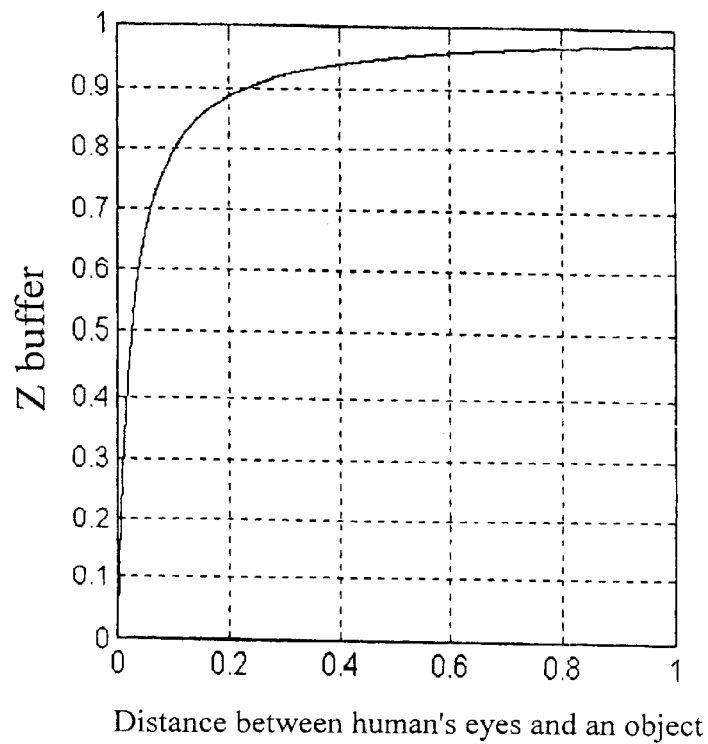

FIG. 3(a) shows a diagram of the distance between the human's eyes and an object vs. the distance between a left or right video and an object. The distance between human's eyes and an object is normalized in advance, and it is assumed that the distance between the human's eyes and a far clipping plane is one and the distance between the human's eyes and a near clipping plane is zero. The far clipping plane and the near clipping plane define respectively the farest and the nearest limits of a range of a visual depth or the video depth of the object, and can be defined by a computer programmer. The well-known Z buffer is represented by the equation: Z_buffer=(Z−N)×F/Z×(F−N), wherein N is a distance between the camera 14 and the near clipping plane, F is a distance between the camera 14 and the far clipping plane, and Z is a distance between the camera 14 and the object. According to the definition illustrated in FIG. 2, Z is equal to b+d, N is almost equal to d, and b is almost equal to Z−N. Thus, the distance between the point 22 and the point 23 can be replaced by Z_buffer×e×(F−N)/F. Because the value of (F−N)/F is almost equal to 1, the distance between the point 22 and the point 23 approaches to Z_buffer×e.

FIG. 3(b) shows a diagram of the distance between the human's eyes and an object vs. Z buffer. Because the distance between the point 22 and the point 23 is e times of Z_buffer, the curves respectively in FIG. 3(a) and FIG. 3(b) are very similar.

Figure 4:
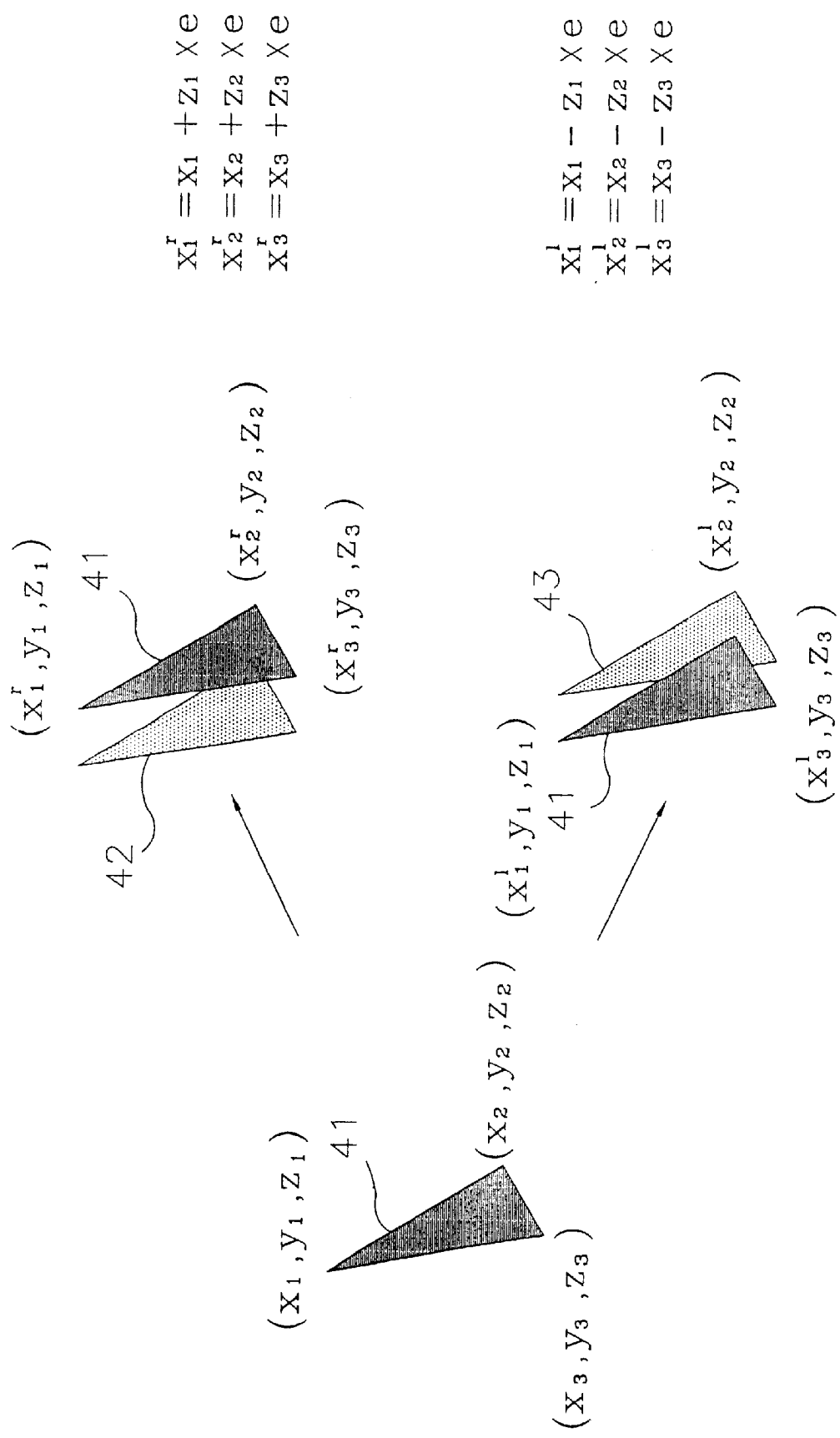
FIG. 4 shows a schematic diagram in which an input video is divided into left and right videos.

FIG. 4 shows a schematic diagram of in which an input video is divided into left and right videos, wherein X coordinate of the left video 42 is the sum of X coordinate of an input video and the value of Z_buffer×e, and X coordinate of the right video 43 is the remainder obtained by subtracting the value of Z_buffer×e from X coordinate of an input video.

Figure 5:
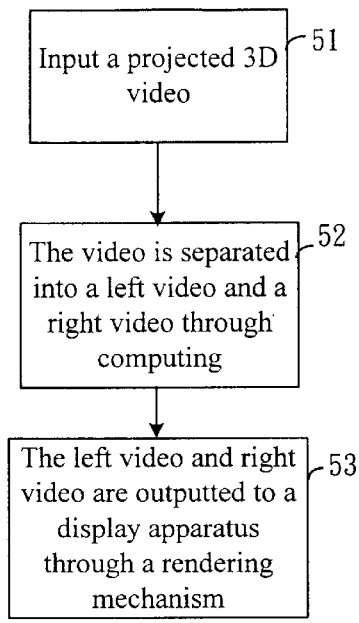
FIG. 5 shows a flow chart of a preferred embodiment of the present invention.

FIG. 5 shows a flow chart of a preferred embodiment of the present invention. Step 51 is to input a 2D video after projection. Step 52 is to transform the 2D video to simulate 3D video seen from the left eye and right eye according to the method illustrated in FIG. 4, and the transform method can be implemented by a software driver or hardware. Step 53 is to enter a 3D rendering process, used to output the left video 42 and right video 43 to a display apparatus outside the apparatus of the present invention.

Figure 6:
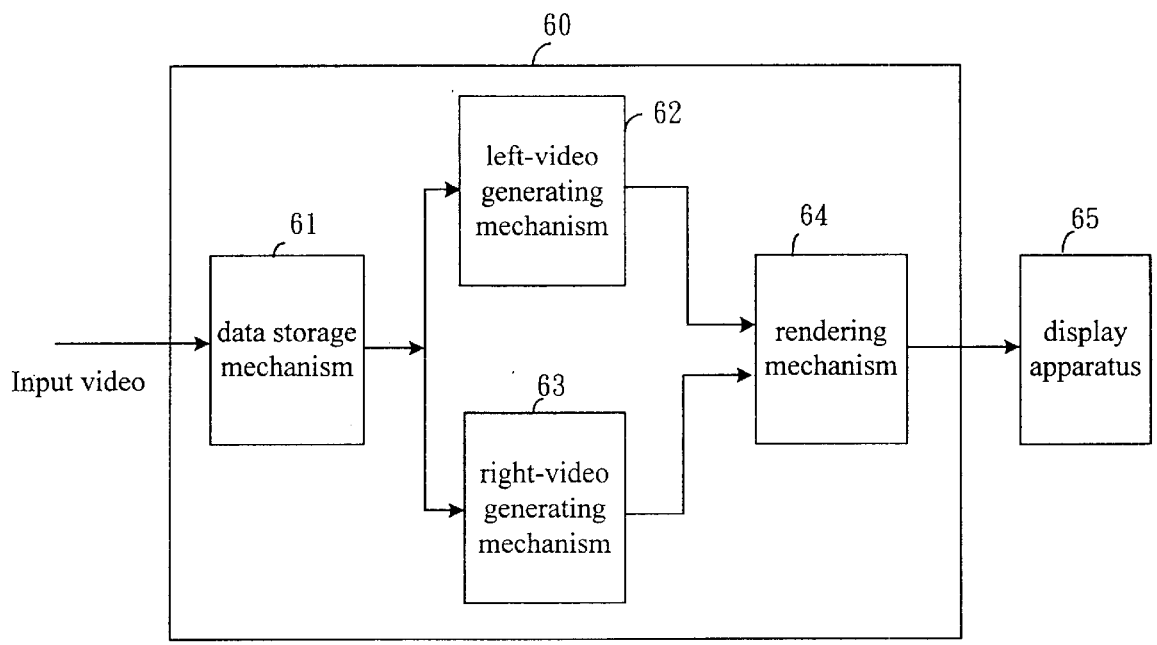
FIG. 6 shows a block diagram of an apparatus according to a preferred embodiment of the present invention.

FIG. 6 shows a block diagram of an apparatus according to a preferred embodiment of the present invention, which is implemented by hardware to generate the left video 42 and the right video 43. The apparatus comprises a data storage mechanism 61, a left-video generating mechanism 62, a right-video generating mechanism 63 and a rendering mechanism 64. The data storage mechanism 61 is used to save an input video, and is not limited to a specific storage media such as well-known DRAM, SRAM, VRAM, registers or hard disk, and so on. The left-video generating mechanism 62 is connected to the data storage mechanism 61 for generating a left video. The X coordinate of the left video is the sum of X coordinate of the input video and (Z_buffer−K)×e, wherein K is a parameter of an adjustable depth. If K is equal to zero, the mathematics expression will be the same as described in FIG. 4. The right-video generating mechanism 63 is connected to the data storage mechanism 61 for generating a right video. The X coordinate of the right video is obtained by subtracting (Z_buffer−K)×e from the X coordinate of the input video. The rendering mechanism 64 is connected to the left-video generating mechanism 62 and the right-video generating mechanism 63 for outputting the left video and right video to a display apparatus 65 outside the apparatus 60 of the present invention.

Figure 7A:
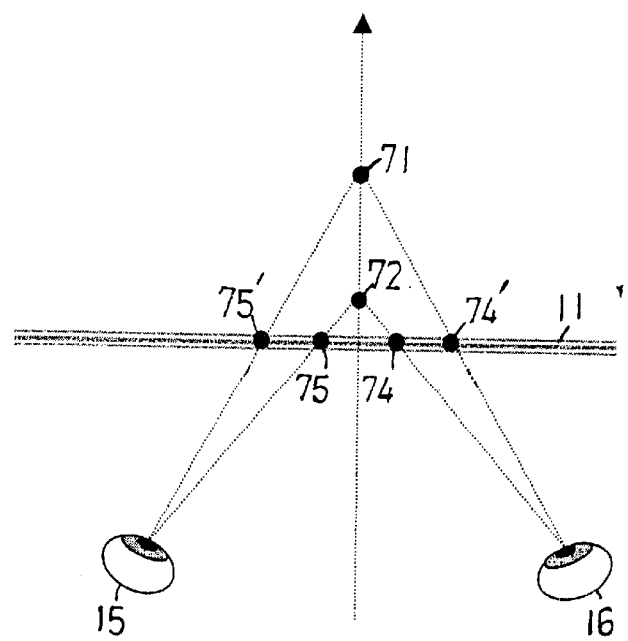
FIG. 7($a$) shows a schematic diagram of different positions of projected videos of an object observed by human's eyes when the depth of the object is changed.
Figure 7B:
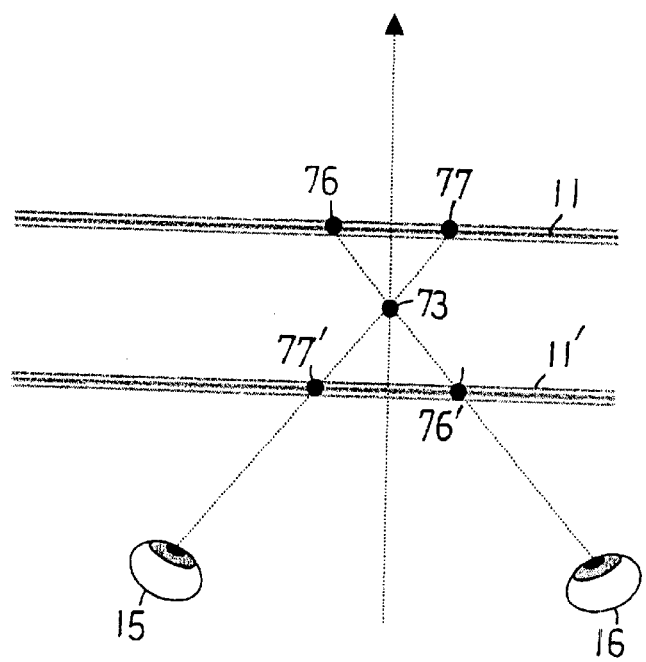

FIGS. 7(a) and 7(b) shows other embodiments of the present invention, wherein a parameter of adjustable depth K is added by a programmmer or by an user to change the distance between the point 22 and the point 23 to (Z_buffer−K)×e. The programmer or the user can adjust the parameters K or e to keep an object farer or nearer. For example, in FIG. 7(a), points 75 and 74 on the display plane 11 of an object 72 correspond respectively to the left eye and right eye. After the parameter e is amplified, the points on the display plane 11 are located at points 75' and 74'. Through the focus effect of the points 75' and 74', the user will feel that the object is located at a position 71 farer than the display plane 11. The user can also adjust the parameter K to keep the display plane 11 farer or nearer than before.

As shown in FIG. 7(b), an object 73 is in front of the display plane 11 originally, wherein the points 77 and 76 on the display plane 11 of the object 73 correspond respectively to left eye and right eye. After the parameter K is amplified, the points 77 and 76 on display plane 11' become points 77' and 76', and it means that the user will feel that the object 73 is farer than before or the display plane 11' is nearer than before. It should be noted that before parameter K is adjusted, the projection of the object corresponding to the right eye is on the left part of the display plane 11, and that the projection of the object corresponding to the left eye is on the right part of the display plane 11. After parameter K is adjusted, the projected object corresponding to the right eye is on the right part of the display plane 11, and the projected object corresponding to the left eye is on the left part of the display plane 11. By the way of changing locations of projection, the human's eyes will strongly feel the 3D effect.

The above-described embodiments of the present invention are intended to be illustrated only. Numerous alternative embodiments may be devised by those skilled in the art without departing from the scope of the following claims.

What claimed is:

1. An apparatus for adjusting 3D transformation applied in a 3D computer graphic processing system comprising a display apparatus, used to transform an input projected 3D video into a 3D video, comprising:

a data storage mechanism for storing said input projected 3D video;

a left-video generating mechanism connected to said data storage mechanism for generating a left video, and X coordinate of said left video being generated by summing X coordinate of said input projected 3D video and (Z_buffer−K)×e;

a right-video generating mechanism connected to said data storage mechanism for generating a right video, and X coordinate of said right video being generated by subtracting (Z_buffer−K)×e from X coordinate of said input projected 3D video; and a rendering mechanism connected to said left-video generating mechanism and said right-video generating mechanism for outputting said left video and said right video to said display apparatus;

wherein Z_buffer represents the depth of said input projected 3D video, K is a parameter for an adjustable depth, and e is half a distance between two eyes of a user.

2. The apparatus of claim 1, wherein said Z_buffer is represented as (Z−N)×F/Z×(F−N), wherein N is the distance between a camera for photoing the video and a near clipping plane, F is the distance between said camera and a far clipping plane, Z is the distance between said camera and an photoed object; said far clipping plane and said near clipping plane are the farest and the nearest limits of a range of a video depth of said photoed object.

3. A method for adjusting 3D transformation applied in a 3D computer graphic processing system comprising a display apparatus, used to transform a projected 3D video into a 3D video, comprising the following steps:

(a) input a projected 3D video;

(b) dividing said projected 3D video into a left video and a right video through computation; and (c) outputting said left video and said right video to said display apparatus through a rendering mechanism, wherein said Z_buffer is represented by (Z−N)×F/Z×(F−N); wherein N is the destance between a camera photoing a video and a near clipping plane, F is the distance between said camera and a far clipping plane, Z is the distance between said camera and an object photoed; and said far clipping plane and said near clipping plane are the farthest and the nearest limits of a range of a video depth of said photoed object.

4. The method of claim 3, wherein X coordinate of said left video shown in step (b) is generated by summing X coordinate of said input projected 3D video and Z_buffer×e, and X coordinate of said right video shown in step (b) is generated by subtracting Z_buffer×e from X coordinate of said input projected 3D video; wherein Z_buffer represents the depth of said input projected 3D video, K is a parameter for an adjustable depth, and e is half a distance between two eyes of a user.

5. The method of claim 3, wherein X coordinate of said left video shown in step (b) is generated by summing X coordinate of said input projected 3D video and (Z buffer−K)×e, and X coordinate of said right video shown in step (b) is generated by subtracting (Z_buffer−K)×e from X coordinate of said input projected 3D video; wherein Z_buffer represents the depth of said input projected 3D video, K is a parameter for an adjustable depth, and e is half a distance between two eyes of a user.

6. The method of claim 3, wherein said left video and said right video shown in step (b) are generated by a software driver.

* * * * *